United States Patent
Guillaume et al.

(10) Patent No.: US 7,687,430 B2
(45) Date of Patent: *Mar. 30, 2010

(54) PROCESS FOR PREPARING AT LEAST ONE COBALT AND/OR NICKEL SALT OF AT LEAST ONE ANDERSON HETERPOLYANION COMBINING MOLYBDENUM AND COBALT OR NICKEL IN ITS STRUCTURE

(75) Inventors: Denis Guillaume, Vienne (FR); Edmond Payen, Jenlain (FR); Carole Lamonier, Armentieres (FR); Karin Marchand, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 115 days.

This patent is subject to a terminal disclaimer.

(21) Appl. No.: 11/878,308

(22) Filed: Jul. 23, 2007

(65) Prior Publication Data
US 2008/0020926 A1    Jan. 24, 2008

(30) Foreign Application Priority Data
Jul. 24, 2006   (FR) .................................. 06 06828

(51) Int. Cl.
*B01J 23/00* (2006.01)
(52) U.S. Cl. ..................... 502/314; 502/313; 502/323; 502/439; 502/415; 502/355; 208/134; 208/108; 208/109; 208/210; 208/213
(58) Field of Classification Search .................. None
See application file for complete search history.

(56) References Cited

U.S. PATENT DOCUMENTS 5,320,741 A    6/1994  Johnson et al.
6,723,891 B1 *  4/2004  Wagner et al. .............. 588/200
2004/0132614 A1 * 7/2004  Harle et al. ................. 502/313

FOREIGN PATENT DOCUMENTS

EP    0565205 A    10/1993
FR    2843050 A1   2/2004

OTHER PUBLICATIONS

C.Martin et al., "Evidence and characterization of a new decamolybdocobaltate cobalt salt: an efficient precursor for hydrotreatment catalyst preparation", Chem Mater, 2005, pp. 4438-4448, vol. 17.
C.I. Cabello et al., "Decamolybdodicobaltate III) heteropolyanion: structural, spectroscopical, thermal and hydrotreating catalytic properties", Journal of Molecular Catalysis, 2002, pp. 89-100, Elsevier Science.

* cited by examiner

*Primary Examiner*—Melvin C Mayes
*Assistant Examiner*—Smita Patel
(74) *Attorney, Agent, or Firm*—Millen, White, Zelano & Branigan, P.C.

(57) ABSTRACT

A process is described for preparing a solution formed by at least one cobalt and/or nickel salt of at least one heteropolyanion combining molybdenum and cobalt or molybdenum and nickel in its structure, said process comprising:
  a) mixing at least one source of molybdenum and at least one oxidizing compound in aqueous solution to synthesize peroxomolybdate ions at an acidic pH, the (oxidizing compound/molybdenum source) mole ratio being in the range 0.1 to 20;
  b) introducing at least one cobalt precursor and/or at least one nickel precursor into the solution from step a) to form a solution comprising at least said salt in which the (Co+Ni)/Mo mole ratio is in the range 0.25 to 0.85.

19 Claims, No Drawings

PROCESS FOR PREPARING AT LEAST ONE COBALT AND/OR NICKEL SALT OF AT LEAST ONE ANDERSON HETEROPOLYANION COMBINING MOLYBDENUM AND COBALT OR NICKEL IN ITS STRUCTURE

The present invention relates to the field of catalysts containing at least molybdenum and at least one group VIII metal selected from nickel and cobalt and prepared from at least one cobalt and/or nickel salt of at least one Anderson type heteropolyanion. More precisely, the present invention relates to the preparation of a solution formed by at least one cobalt and/or nickel salt of at least one heteropolyanion combining at least molybdenum and cobalt or at least molybdenum and nickel in its structure. The present invention also relates to the use of said solution to prepare catalysts, especially hydrotreatment catalysts for hydrorefining and/or hydroconversion of hydrocarbon feeds such as oil cuts, cuts from coal or hydrocarbons produced from natural gas, more particularly from hydrocarbon feeds containing heteroatoms. The term "hydrorefining" includes hydrogenation, hydrodenitrogenation, hydrodeoxygenation, hydrodearomatization, hydrodesulphurization, hydrodemetallization, hydroisomerization, hydrodealkylation and dehydrogenation.

Hydrorefining hydrocarbon feeds such as sulphur-containing oil cuts is rapidly gaining importance in refining with the increasing necessity for reducing the quantity of sulphur present in oil products and for converting heavy fractions into lighter fractions which can be upgraded as fuels. This is partly due to the economic interest in upgrading crudes with ever-increasing heavy fractions, which are depleted in hydrogen and rich in heteroatoms including nitrogen and sulphur, and also due to the specifications imposed in various states on commercial fuels.

Current catalytic hydrorefining processes use catalysts which are capable of promoting the principal reactions used and to using said cuts, in particular the hydrogenation of aromatics (HAR), hydrodesulphurization (HDS), hydrodenitrogenation (HDN) and other hydroeliminations. Hydrorefining is employed to process feeds such as gasoline, gas oils, vacuum gas oils, atmospheric or vacuum residues, which may or may not be deasphalted. It is also indicated in the pretreatment of feeds for cracking and catalytic hydrocracking processes. At least one hydrorefining step is normally integrated into each of the known processes for upgrading oil cuts.

The context of the present invention, summarized above, is well known to the skilled person.

The problem for the skilled person is to obtain high catalytic performances in catalytic hydrorefining processes, especially as regards activity, and particularly for hydrodesulphurization processes, while guaranteeing satisfactory industrial implementation.

It is now accepted that oxide precursors containing heteropolyanions associating in the same molecule at least one element from group VI, in general molybdenum and/or tungsten, and at least one element from group VIII, in general cobalt and/or nickel result, after sulphurization, result in catalysts the catalytic activity of which is substantially superior to that of catalysts prepared from standard precursors not containing such heteropolyanions. The origin of that better activity is linked to a better promotional effect of the group VI element, in general molybdenum and/or tungsten, by the group VIII element, in general cobalt and/or nickel, after the sulphurization activation step. When supported on a porous matrix, said oxide precursors based on heteropolyanions can also significantly enhance the dispersion of the active phase, which also favours catalytic activity.

The consequences of this association between the elements from groups VI and VIII in the same molecular structure on catalytic activity have been reported in documents U.S. Pat. No. 2,547,380, FR-A-2 759 778 and EP-A-1 393 802 and published in the international scientific literature, especially in articles in the Journal of Catalysis, 1999, volume 188, 1, pages 102-110, in Applied Catalysis A: General 2001, volume 220, pages 113-121 and in Chemistry Materials, 2005, volume 17, page 4438 to 4448.

Heteropolyanions include those with an Anderson structure combining molybdenum and cobalt or molybdenum and nickel in the same structure, which, when in the form of cobalt or nickel salts, have a promoter (Co and/or Ni)/Mo atomic ratio in the range 0.4 to 0.6, i.e. close to or equalling the optimum ratio, known to the skilled person, for maximizing the performances of hydrotreatment catalysts. As an example, $Co^{II}$ or $Ni^{II}$ salts of the monomeric 6-molybdocobaltate ion (with formula $Co^{II}_{2/3}[Co^{III}Mo_6O_{24}H_6]$ or $Ni^{II}_{3/2}[Co^{III}Mo_6O_{24}H_6]$) and $Co^{II}$ or $Ni^{II}$ salts of the dimeric decamolybdocobaltate ion (with formula $Co^{II}_3[Co^{III}_2Mo_{10}O_{38}H_4]$ or $Ni^{II}_3[Co^{III}_2Mo_{10}O_{38}H_4]$ are characterized by promoter (Co and/or Ni)/Mo atomic ratios of 0.41 and 0.5 respectively. By way of further example, $Co^{II}$ or $Ni^{II}$ salts of the 6-molybdonickellate ion (with formula $Ni^{II}_2[Ni^{III}Mo_6O_{24}H_6]$ and $Co^{II}$ or $Ni^{II}$ salts of the dimeric decamolybdonickellate ion (with formula $Ni^{II}_4[Ni^{II}_2Mo_{10}O_{38}H_4]$ are characterized by promoter (Co and/or Ni)/Mo atomic ratios of 0.5 and 0.6 respectively.

The $Ni^{II}$ or $Co^{II}$ salts of heteropolyanions with an Anderson structure, which combine molybdenum and cobalt or molybdenum and nickel in the same structure, may be characterized by Raman spectroscopy, UV-visible spectroscopy, X ray absorption spectroscopy and nuclear magnetic resonance. According to EP-A-1 393 802, when supported on a porous matrix of a hydrotreatment catalyst used in hydrorefining and hydroconversion processes, in particular in aromatic hydrocarbon hydrogenation, hydrodesulphurization and hydrodenitrogenation processes, these salts have higher catalytic activities than those of catalytic formulations which are free of heteropolyanion salts with an Anderson structure.

Anderson structure heteropolyanions are known to the skilled person. Isopolyanions, denoted $M_kO_y^{t-}$, are obtained by condensing oxoanions $MO_4^{n-}$ where M is a metal atom. Condensation occurs by acidification of the medium and then water molecules are eliminated and oxo bridges are created between the metal atoms. Molybdenum compounds are well known for this type of reaction since, depending on the pH, the molybdenum compound in solution may be in the $MoO_4^{2-}$ form or in the form of an Anderson isopolyanion $Mo_7O_{24}^{6-}$ obtained in accordance with the reaction $7MoO_4^{2-}+8H^+\rightarrow Mo_7O_{24}^{6-}+4H_2O$. In the presence of an oxo anion $XO_4^{p-}$, where X is an atom which is different from M, the metal atoms associate around this oxo anion and polycondensation then results in a mixed species termed a heteropolyanion and denoted $X_xM_kO_y^{z-}$. Reactions for forming those polyoxometallates (POM) are governed by various experimental factors such as pH, the concentration of the species in solution, the nature of the solvent and the ratio of the number of metal atoms M/X. A particular structure in the case in which M/X=6, $XM_6O_{24}^{n-}$, was proposed by Anderson (Nature 140, page 850, published in 1937); it comprises 7 octahedra located in the same plane and connected together by the edges: 6 octahedra surround the central octahedron containing the heteroatom. The heteropolyanions $Co^{III}Mo_6O_{24}H_6^{3-}$ and $Ni^{II}Mo_6O_{24}H_6^{4-}$ are good examples of Anderson heteropolyanions.

According to EP-A-1 393 802, preparing heteropolyanion salts necessitates constituent steps some of which are long and difficult to carry out on an industrial scale. The preparation method described in EP-A-1 393 802 qualifies as an indirect method as it consists of preparing the ammonium salt of the heteropolyanion, necessitating precipitation, filtration and crystallization steps, then solution exchanging the ammonium ions of the heteropolyanion with cobalt or nickel cations, by adding to the reaction medium a compound the anion of which forms a highly insoluble compound with ammonium cations which precipitates out and which is separated from the solution containing the cobalt and/or nickel cations and the heteropolyanion. Crystalline Co or Ni salts of the heteropolyanion are then obtained by crystallization. These salts, subsequently re-dissolved in water, may constitute impregnation solutions for the preparation of the oxide phase of supported hydrotreatment catalysts, by the dry impregnation technique which is well known to the skilled person. This indirect preparation has been published in the international literature for the preparation of the $Co^{II}$ salt of the dimeric decamolybdocobaltate ion (with formula $Co^{II}_3$ $[Co^{III}_2Mo_{10}O_{38}H_4]$ in the review Chemistry Materials, 2005, volume 17, page 4438-4448. It should be noted that producing the dimeric form of Anderson heteropolyanions using that indirect preparation method further necessitates the use of a dimerizing agent such as activated charcoal or Raney nickel. Further, the compounds used for the exchange reaction are generally cobalt or nickel salts of phosphomolybdic acid, the preparation of which also requires a certain number of constituent steps which are lengthy and difficult to carry out on an industrial scale (neutralization, exchange reaction, filtration and crystallization). Further, that method involves taking the ammonium salt of the heteropolyanion into solution. However, as reported in the review Inorganic Chemistry, volume 43 page 4636 published in 2004, its solubility is lower than the equivalent cobalt salt (0.17 mol of Mo per litre of solution of the ammonium salt as opposed to 1.08 mol of Mo per litre of solution in the case of the cobalt salt). Thus, this means that when catalysts with a high active phase content are envisaged ($MoO_3$>16% by weight), the solution must be re-concentrated or a two stage impregnation must be carried out, which renders such a method more difficult to carry out on an industrial scale.

To overcome these disadvantages, the present invention proposes a novel method for preparing at least one cobalt and/or nickel salt of at least one Anderson heteropolyanion combining in its structure at least molybdenum and cobalt or at least molybdenum and nickel. Said novel method is simplified and necessitates far fewer steps for the preparation of at least said salt of at least said Anderson heteropolyanion than that known in the prior art. Further, it has the advantage of resulting in at least one cobalt salt and/or nickel salt of at least one Anderson heteropolyanion combining at least molybdenum and cobalt or at least molybdenum and nickel in its structure in which the $MoO_3$ content may be substantially increased because of the better solubility of said salt compared with salts prepared indirectly as described above. This means that catalytic precursors with a substantially increased quantity of active phase constituted by $MoO_3$ can be prepared; said salt(s) present in solution is (are) used for the preparation of the oxide phase of supported catalysts, especially supported hydrotreatment catalysts, or for the preparation of bulk catalysts, especially bulk hydrotreatment catalysts, after crystallization thereof.

In the supported and bulk state, the Co and/or Ni salt(s) of Anderson heteropolyanions prepared in accordance with the present invention, after drying at a temperature of less than 150° C., retain their Raman and UV-visible spectroscopic signatures (diffuse reflectance) and, for the same conditions (supported or bulk), for example the same active phase or same content by volume, produce hydrotreatment catalysts having identical or superior performances compared with those obtained with catalysts prepared from salts of heteropolyanions synthesized by the indirect path.

DESCRIPTION OF THE INVENTION

The present invention provides a process for preparing a solution formed by at least one cobalt and/or nickel salt of at least one heteropolyanion combining molybdenum and cobalt or molybdenum and nickel in its structure, said preparation process comprising:

a) mixing at least one source of molybdenum and at least one oxidizing compound in aqueous solution to synthesize peroxomolybdate ions at an acidic pH, the (oxidizing compound/molybdenum source) mole ratio being in the range 0.1 to 20;

b) introducing at least one cobalt precursor and/or at least one nickel precursor into the solution from step a) to form a solution comprising at least said salt in which the (Co+Ni)/Mo mole ratio is in the range 0.25 to 0.85.

In accordance with the process of the invention, step a) results in the synthesis of peroxomolybdate ions. The peroxomolybdate ions synthesized during step a) of the process of the invention belong to the group constituted by the monomeric peroxomolybdate entity $MoO_3(O_2)^{2-}$, the dimeric peroxomolybdate entity $Mo_2O_3(O_2)_4^{2-}$ and intermediate monomeric di-, tri- and tetra-peroxomolybdate species with formula $MoO_2(O_2)_2^{2-}$, $MoO(O_2)_3^{2-}$, and $Mo(O_2)_4^{2-}$ and mixtures thereof. Preferably, the synthesis conditions are adapted during step a) to prepare dimeric peroxomolybdate ions, the principal peaks of which in Raman spectroscopy are located at 540 $cm^{-1}$ and 970 $cm^{-1}$. Monomeric peroxomolybdate ions are characterized in Raman spectroscopy by principal peaks located at 560 and 930 $cm^{-1}$, and the di-, tri- and tetra-peroxomolybdate species are characterized by intermediate peaks in the range 540 and 560 $cm^{-1}$ and in the range 930 and 970 $cm^{-1}$ and correspond to elongation modes.

Said step a) of the process of the invention is carried out by mixing at least one source of molybdenum and at least one oxidizing compound in aqueous solution. Mixing is carried out until a clear aqueous solution is obtained in which the source of the molybdenum is entirely dissolved by the action of said oxidizing compound. This mixture may be produced with stirring at ambient temperature, or it may be heated under reflux between 30° C. and 90° C., preferably between 50° C. and 60° C., for a few minutes to a few hours until a clear aqueous solution is obtained. Said clear solution, obtained at the end of step a) and containing said peroxomolybdate ions, has an acidic pH, more precisely a pH of less than 5, preferably less than 2.5, highly preferably less than 1 and still more preferably less than 0.5.

The source of molybdenum used to carry out said step a) of the preparation process of the invention is selected from molybdenum oxides, molybdenum hydroxides, molybdic acids and salts thereof, in particular ammonium salts such as ammonium molybdate, dimolybdate, heptamolybdate and octamolybdate. Preferably, the molybdenum source is molybdenum oxide, $MoO_3$.

The oxidizing compound used to carry out said step a) of the preparation process of the invention is selected from hydrogen peroxide, $H_2O_2$, and alkyl hydroperoxides (R—OOH), in particular tertiobutyl-hydroperoxide (tBu—OOH). Hydrogen peroxide is advantageously used as the oxidizing compound.

In step a) of the process of the invention, said oxidizing compound and the molybdenum source are mixed in aqueous solution in proportions such that the mole ratio between the oxidizing compound and the molybdenum source is in the range 0.1 to 20, advantageously in the range 0.5 to 10 and highly advantageously in the range 2 to 7.

In accordance with step b) of the preparation process of the invention, at least one cobalt and/or at least one nickel precursor is (are) introduced into the clear aqueous solution with an acidic pH, derived from said step a) to form a solution comprising at least one cobalt salt and/or nickel salt and at least one heteropolyanion combining molybdenum and cobalt or molybdenum and nickel in its structure. Said solution obtained at the end of step b) of the process of the invention has a pH of more than 3, preferably 3.5 or more and highly preferably in the range 3.5 to 4.0. Preferably, said step b) results in the formation of a solution comprising at least one cobalt or nickel salt of at least one heteropolyanion combining molybdenum and cobalt or molybdenum and nickel in its structure, said salt belonging to the group constituted by the salts $Co^{II}_{3/2}[Co^{III}Mo_6O_{24}H_6]$, $Ni^{II}_{3/2}[Co^{III}Mo_6O_{24}H_6]$, $Co^{II}_3[Co^{III}_2Mo_{10}O_{38}H_4]$, $Ni^{II}_3[Co^{III}_2Mo_{10}O_{38}H_4]$, $Ni^{II}_2[Ni^{II}Mo_6O_{24}H_6]$ and $Ni^{II}_4[Ni^{II}_2Mo_{10}O_{38}H_4]$.

The cobalt and/or nickel precursors introduced into the solution containing the peroxomolybdate ions from step a) are selected from the group constituted by nitrates, sulphates, phosphates, halides, carboxylates such as acetates, carbonates, hydroxides and oxides. Preferably, precursors based on carbonate are used, along with precursors based on hydroxide and hydroxycarbonate precursors. The preferred cobalt precursor is carbonate cobalt and the preferred nickel precursor is nickel hydroxycarbonate.

In accordance with the invention, the cobalt and/or nickel precursors are advantageously introduced into the solution from step a), preferably after cooling it to ambient temperature in the case in which dissolution is carried out at a temperature above ambient temperature. Said precursors are introduced with care and in a controlled manner to accommodate the exothermicity and effervescence which occurs when using certain precursors, in particular those based on carbonate. Preferably, cobalt and/or nickel precursors are not introduced in the presence of a strong acid, especially $H_2SO_4$, $HNO_3$ or HCl, or an organic acid, in particular citric acid.

In a first implementation of step b) of the process of the invention, at least one cobalt precursor is introduced into said solution derived from step a) in the absence of nickel precursor, to form at least one cobalt salt of at least one heteropolyanion combining molybdenum and cobalt in its structure. The cobalt precursor is introduced in a quantity such that the Co/Mo mole ratio is in the range 0.40 to 0.85, preferably in the range 0.40 to 0.55. Particular salts prepared using this first implementation are $Co^{II}_{3/2}[Co^{III}Mo_6O_{24}H_6]$ corresponding to the monomeric Anderson heteropolyanion $(Co^{III}Mo_6O_{24}H_6)^{3-}$ and the salt $Co^{II}_3[Co^{III}_2Mo_{10}O_{38}H_4]$ corresponding to the dimeric Anderson heteropolyanion $(Co^{III}_2Mo_{10}O_{38}H_4)^{6-}$. They may be present alone or as a mixture in said solution from step b). Said salts preferably use cobalt carbonate $Co(CO_3)_2$ as a cobalt precursor.

In a second implementation of step b) of the process of the invention, at least one nickel precursor is introduced into said solution from step a) in the absence of a cobalt precursor, to form at least one nickel salt of at least one heteropolyanion combining molybdenum and nickel in its structure. The nickel precursor is introduced in a quantity such that the Ni/Mo mole ratio is in the range 0.40 and 0.85, preferably in the range 0.45 to 0.65. Particular salts prepared using this second implementation are the salt $Ni^{II}_2[Ni^{II}Mo_6O_{24}H_6]$ corresponding to the monomeric Anderson heteropolyanion $(Ni^{II}Mo_6O_{24}H_6)^{4-}$ and the salt $Ni^{II}_4[Ni^{II}_2Mo_{10}O_{38}H_4]$ corresponding to the dimeric Anderson heteropolyanion $(Ni^{II}_2Mo_{10}O_{38}H_4)^{8-}$ They may be present alone or as a mixture in said solution from step b). Such salts preferably use nickel hydroxycarbonate as the nickel precursor.

In a third implementation of step b) of the process of the invention, at least one cobalt precursor and at least one nickel precursor are introduced into said clear solution from step a). Preferably, said step b) is implemented by introducing at least one nickel precursor followed by introducing at least one cobalt precursor into said solution from step a). The cobalt and nickel precursors are introduced in a proportion such that the (Co+Ni)/Mo mole ratio is in the range 0.25 to 0.85 and preferably in the range 0.28 to 0.55. The nickel precursor is introduced in a proportion such that the Ni/Mo mole ratio is in the range 0.20 to 0.40, preferably in the range 0.25 to 0.35. The cobalt precursor is introduced in a proportion such that the Co/Mo mole ratio is in the range 0.10 to 0.30, preferably in the range 0.15 to 0.25. Particular salts prepared using this third implementation are the salt $Ni^{II}_{3/2}[Co^{III}Mo_6O_{24}H_6]$ corresponding to the monomeric Anderson heteropolyanion $(Co^{III}Mo_6O_{24}H_6)^{3-}$ and the salt $Ni^{II}_3[Co^{III}_2Mo_{10}O_{38}H_4]$, corresponding to the dimeric Anderson heteropolyanion $(Co^{III}_2Mo_{10}O_{38}H_4)^{6-}$. They may be present alone or as a mixture in said solution from step b). Preferably, the preparation of said salts uses nickel hydroxycarbonate as the nickel precursor and cobalt carbonate as the cobalt precursor.

In accordance with the invention, the presence in solution of at least one Co and/or Ni salt of at least one monomeric $(Co^{III}Mo_6O_{24}H_6^{3-}$, $Ni^{II}Mo_6O_{24}H_6^{4-})$ and dimeric $(Co^{III}_2Mo_{10}O_{38}H_4^{6-}$, $Ni^{II}_2Mo_{10}O_{38}H_4^{8-})$ Anderson heteropolyanion may be characterized by Raman spectroscopy by dint of the relative displacements of the elongation modes of Mo—$O_{2t}$ bonds at 903, 920 and 952 cm$^{-1}$ for monomeric Anderson heteropolyanions and at 917 and 957 cm$^{-1}$ for dimeric Anderson heteropolyanions. Similarly in Raman spectroscopy, the displacements corresponding to the vibrational modes of Mo—O—X bonds (where X=Co or Ni) are located at 560 and 575 cm$^{-1}$ for monomeric species and at 565 and 602 cm$^{-1}$ for dimeric species. In solution, in the case of Co and/or Ni salts of Anderson heteropolyanions based on molybdenum and cobalt, cobalt with an oxidation number of +3 in the structure of the Anderson heteropolyanion can also be discerned, by UV-visible spectroscopy, from the cobalt or nickel with an oxidation number of +2 present as a counter ion in the salt. $Co^{2+}$ or $Ni^{2+}$ is characterized by an absorption band at 510-515 nm, corresponding to the $^4T_{2g} \rightarrow ^4T_{1g}$ transition of $Co^{2+}$ (d7) or $Ni^{2+}$ (d7s1) in an octahedral environment, while $Co^{3+}$ is characterized by 2 absorption bands at 410 and 600 nm, attributed to two d-d transitions of $Co^{3+}$ (d6) in octahedral coordination, respectively $^1A_{1g} \rightarrow ^1T_{2g}$ and $^1A_{1g} \rightarrow ^1T_{1g}$.

Co and/or Ni salt(s) of at least one Anderson heteropolyanion combining molybdenum and cobalt or molybdenum and nickel in its structure prepared using the process of the present invention have the same Raman and UV-visible characteristics as those exhibited by the salts of heteropolyanions prepared using the indirect method described in EP-A-1 393 802.

In accordance with the process of the invention, none of the steps leads to the formation of an ammonium salt of the desired heteropolyanion.

A particularly preferred process of the invention for preparing a solution formed by at least one cobalt and/or nickel salt of at least one Anderson heteropolyanion combining at least molybdenum and cobalt and/or at least molybdenum and nickel in its structure consists of mixing in aqueous solution molybdenum oxide $MoO_3$ and hydrogen peroxide, the $MoO_3/H_2O_2$ mole ratio being in the range 2 to 7 and the pH of the clear solution obtained after complete dissolution of the molybdenum oxide by the action of the hydrogen peroxide being less than 2.5, preferably less than 0.5, then introducing cobalt carbonate, at ambient temperature, into said clear solution and in a proportion such that the Co/Mo mole ratio is in the range 0.25 to 0.85, preferably in the range 0.28 to 0.55, the pH of the solution after completely dissolving the cobalt carbonate being more than 3, preferably 3.5 or more. The molybdenum concentration of the prepared solutions is 2.6 moles of molybdenum per litre of solution. By way of comparison, the indirect preparation according to EP-A-1 393 802 can only produce a solution with a concentration of 1.8 moles of molybdenum per litre of solution for the dimeric form $Co^{III}_2Mo_{10}O_{38}H_4^{6-}$ and 1.06 for the $Co^{III}Mo_6O_{24}H_6^{3-}$ form.

The present invention also pertains to the use of the solution formed by at least one cobalt and/or nickel salt of at least one Anderson heteropolyanion combining molybdenum and cobalt or molybdenum and nickel in its structure and prepared using the process of the invention to prepare catalysts, in particular hydrotreatment catalysts. More precisely, the solution formed by at least one said salt obtained using the process of the invention described above is advantageously used as an impregnation solution to prepare the oxide phase of supported catalysts, especially supported hydrotreatment catalysts, or as a source, after crystallization, of crystalline salts which can be used to prepare bulk catalysts, especially bulk hydrotreatment catalysts.

A supported catalyst can be prepared using the solution formed by at least one said salt as an impregnation solution in a conventional manner using any technique known to the skilled person, said solution being introduced before, during or after forming the support using methods which are well known to the skilled person. A preferred method for preparing said supported catalyst consists a) of introducing the solution formed by at least one cobalt and/or nickel salt of at least one heteropolyanion combining molybdenum and cobalt or molybdenum and nickel in its structure onto a formed support by dry impregnation, b) by leaving the moist solid in an atmosphere saturated with water at a temperature in the range 10° C. to 80° C.; c) drying the solid obtained in step b) at a temperature in the range 10° C. to 150° C., preferably in the range 30° C. to 135° C. The dried catalyst obtained in step c) advantageously undergoes a second heat treatment carried out at a temperature in the range 80° C. to 800° C., preferably in the range 150° C. to 600° C. and more preferably in the range 200° C. to 550° C., in an oxidizing atmosphere (for example air or oxygen), a neutral atmosphere (for example nitrogen or argon) or a reducing atmosphere (for example hydrogen).

The support present in the supported catalyst prepared using the process described above is formed by at least one porous mineral matrix, normally amorphous or of low crystallinity. Said matrix is normally selected from the group formed by alumina, silica, silica-alumina, magnesia, clay, titanium oxide, boron oxide, zirconium oxide, lanthanum oxide, cerium oxide, aluminium phosphates, boron phosphates or a mixture of at least two of the oxides cited above; alumina-boron oxide combinations, alumina-titanium oxide mixtures, alumina-zirconia mixtures and titanium oxide-zirconium mixtures are particularly preferred. It is also possible to use aluminates, for example magnesium, calcium, barium, manganese, iron, cobalt, nickel, copper or zinc aluminates, and mixed aluminates, for example those containing at least two of the metals cited above. It is also possible to select titanates, for example zinc, nickel or cobalt titanates. Preferably, matrices containing alumina are used, in all of its forms known to the skilled person, for example gamma alumina. It is also possible to use mixtures of alumina and silica and mixtures of alumina and boron oxide.

It is also possible to use a doped support based on gamma alumina the properties of which have been modified at the moment the boehmite gel is mixed with any precursor of the element to inhibit sintering of the alumina during calcining, such as phosphorus, molybdenum or boron. More precisely, the boehmite gel selected as a matrix is co-mixed with phosphoric acid or any precursor from group VIb, the mixture then being formed and calcined to produce a doped support based on gamma alumina, which is suitable when preparing supported catalysts based on at least one cobalt and/or nickel salt of at least one Anderson heteropolyanion combining molybdenum and cobalt or molybdenum and nickel in its structure.

In addition to at least one of the compounds cited above, said matrix composing the support may also comprise at least one simple synthetic or natural phyllosilicate 2:1 dioctahedral or phyllosilicate 3:1 trioctahedral type clay such as kaolinite, antigorite, chrysotile, montmorillonite, beidellite, vermiculite, talc, hectorite, saponite or laponite. Those clays may optionally be delaminated. Preferably, the support is a matrix formed by a mixture of alumina and clay or a mixture formed from silica-alumina and clay.

In addition to at least one of the compounds cited above, said matrix may also comprise at least one compound selected from the group formed by the family of molecular sieves of the crystalline aluminosilicate type, synthetic and natural synthetic zeolites such as Y zeolite, fluorinated Y zeolite, Y zeolite containing rare earths, X zeolite, L zeolite, beta zeolite, small pore mordenite, large pore mordenite, omega zeolites, NU-10, ZSM-22, NU-86, NU-87, NU-88, and ZSM-5 zeolite. It is usual to prefer zeolites with a silicon/aluminium framework atomic ratio (Si/Al) of more than about 3:1. Advantageously, zeolites with a faujasite structure are used, in particular stabilized and ultra-stabilized (USY) Y zeolites, either in the at least partially exchanged form with metallic cations, for example cations of alkaline-earth metals and/or cations of rare earth metals with atomic numbers of 57 to 71 inclusive, or in the hydrogen form (Zeolite Molecular Sieve Structures, Chemistry and Uses, D W Breck, J Wiley & Sons, 1973).

The acidic supports may also be selected from the group formed by the family of non-zeolitic crystalline molecular sieves such as mesoporous silicas, silicalite, silicoaluminophosphates, aluminophosphates, ferrosilicates, titanium silicoaluminates, borosilicates, chromosilicates and transition metal aluminophosphates (including cobalt).

The supported catalysts prepared from at least one cobalt and/or nickel salt of at least one Anderson heteropolyanion generally comprise, in the dry state as a % by weight with respect to the total catalyst mass:

1% to 99.9%, preferably 5% to 99.5% and more preferably 10% to 99% of at least one porous mineral matrix;

0.1% to 99%, preferably 0.5% to 95% and more preferably 1% to 90% of at least one cobalt and/or nickel salt of at least one Anderson heteropolyanion combining molybdenum and cobalt or molybdenum and nickel in its structure;

0 to 80%, preferably 3% to 70% and more preferably 5% to 60% of at least one zeolitic molecular sieve, for example a Y zeolite with a faujasite structure, generally in the hydrogen form.

The cobalt and/or nickel salt(s) of at least one heteropolyanion combining molybdenum and cobalt or molybdenum and nickel in its structure present in the supported catalyst in the dry state is (are) preferably selected from the following salts: $Co^{II}_{3/2}[Co^{III}Mo_6O_{24}H_6]$, $Ni^{II}_{3/2}[Co^{III}Mo_6O_{24}H_6]$, $Co^{II}_3$ $[Co^{III}_2Mo_{10}O_{38}H_4]$, $Ni^{II}_3[Co^{III}_2Mo_{10}O_{38}H_4]$, $Ni^{II}_2$ $[Ni^{II}Mo_6O_{24}H_6]$ and $Ni^{II}_4[Ni^{II}_2Mo_{10}O_{38}H_4]$.

A bulk catalyst, preferably a bulk hydrotreatment catalyst, can be prepared from at least one cobalt and/or nickel salt of at least one heteropolyanion combining molybdenum and cobalt or molybdenum and nickel in its structure using any conventional method which is known to the skilled person. In general and advantageously, at least said salt obtained after evaporating the solution prepared using the process of the present invention is mechanically mixed with a matrix acting as a binder, and finally, after forming, drying is carried out optionally followed by a step for calcining said mechanical mixture. Forming may be carried out using any method which is well known to the skilled person and which is described in pages 122 to 132 in the publication "Catalyse de contact, conception, preparation et mise en oeuvre des catalyseurs industriels" [Contact catalysis, design, preparation and use of industrial catalysts], published by J F Le Page, Technip, publishers, 1978, such as pelletization, co-mixing followed by extrusion or even the drop coagulation technique. Preferably, forming into extrudates with a diameter in the range 0.5 to 3.5 mm is carried out, more preferably in the range 0.8 to 2.5 mm.

A bulk catalyst prepared from at least one cobalt and/or nickel salt of at least one Anderson heteropolyanion, in the dry state as a % by weight with respect to the total catalyst mass, generally comprises 0.01% to 100%, preferably 0.05% to 100% and more preferably 0.1% to 100% of at least one of said salts. The cobalt and/or nickel salt(s) of at least one Anderson heteropolyanion combining molybdenum and cobalt or molybdenum and nickel in its structure present in the bulk catalyst in the dry state is (are) preferably selected from the following salts: $Co^{II}_{3/2}[Co^{III}Mo_6O_{24}H_6]$, $Ni^{II}_{3/2}$ $[Co^{III}Mo_6O_{24}H_6]$, $Co^{II}_3[Co^{III}_2Mo_{10}O_{38}H_4]$, $Ni^{II}_3$ $[Co^{III}_2Mo_{10}O_{38}H_4]$, $Ni^{II}_2[Ni^{II}Mo_6O_{24}H_6]$ and $Ni^{II}_4$ $[Ni^{II}_2Mo_{10}O_{38}H_4]$.

According to the invention, in the structure of the Anderson heteropolyanion combining at least molybdenum and at least cobalt or at least molybdenum and at least nickel, the number of bonds connecting the cobalt to the molybdenum or nickel to molybdenum and with a length of 3.6 angstroms or less is strictly more than 2, i.e. more than 2 molybdenum atoms surround the cobalt or nickel atoms at a distance of 3.6 Angstroms or less. This type of characteristic is readily demonstrated by X ray absorption spectroscopy. The high number of atoms which neighbour molybdenum in the immediate proximity of cobalt or nickel means a strong interaction, in catalysts prepared from at least one cobalt and/or nickel salt of at least one Anderson heteropolyanion of the invention combining molybdenum and cobalt or molybdenum and nickel in its structure, between the molybdenum and the cobalt or the molybdenum and the nickel.

Preferably, more than 2 bonds connecting the nickel or the cobalt to the molybdenum have a length of 3.5 Angstroms or less in the catalyst in the dry state prepared from at least one cobalt and/or nickel salt of at least one Anderson heteropolyanion of the invention combining molybdenum and cobalt or molybdenum and nickel in its structure.

In accordance with the invention, catalysts prepared from at least one cobalt and/or nickel salt of at least one Anderson heteropolyanion of the invention may be catalysts in the dry state containing at least one cobalt and/or nickel salt of at least one heteropolyanion combining molybdenum and cobalt or molybdenum and nickel in its structure or catalysts in the calcined state obtained by calcining dry catalysts. In accordance with the invention, a calcined catalyst contains at least cobalt and at least molybdenum or at least nickel and at least molybdenum, in which the cobalt or the nickel is in strong interaction with the molybdenum, and is prepared from at least one cobalt and/or nickel salt of at least one heteropolyanion combining at least molybdenum and at least cobalt or at least molybdenum and at least nickel in its structure, in which the number of bonds connecting the nickel or the cobalt to the molybdenum and having a length of 3.6 Angstroms or less, preferably 3.5 Angstroms or less, is strictly more than 2. The catalysts advantageously contain 7% to 23% by weight of molybdenum oxide, $MoO_3$.

The catalysts of the invention prepared from at least one cobalt and/or nickel salt of at least one Anderson heteropolyanion and being either in the dry state or in the calcined state preferably undergo a sulphurization treatment to obtain sulphide type catalysts, the sulphurization treatment allowing at least partial transformation of the metallic species into sulphides before bringing them into contact with the feed to be treated. This sulphurization activation treatment is well known to the skilled person and may be carried out using any method described in the literature. The sulphur source may be elemental sulphur, carbon sulphide, hydrogen sulphide, sulphur-containing hydrocarbons such as dimethylsulphide, dimethyldisulphide, mercaptans, thiophene compounds, thiols, polysulphides such as di-tertiononylpolysulphide or TPS from ARKEMA, oil cuts which are rich in sulphur such as gasoline, kerosene, or gas oil, used alone or as a mixture with a sulphur-containing compound cited above. The preferred source of sulphur is hydrogen sulphide or sulphur-containing hydrocarbons such as dimethyldisulphide. One conventional well known method consists of heating the catalyst, placed in the presence of hydrogen sulphide (pure or, for example in a stream of a hydrogen/hydrogen sulphide mixture) to a temperature in the range 150° C. to 800° C., preferably in the range 250° C. to 600° C., generally in a traversed bed reaction zone.

The catalysts prepared from at least one cobalt and/or nickel salt of at least one Anderson heteropolyanion of the invention and being either in the dry state or in the calcined state are used for hydrorefining and/or hydroconversion of hydrocarbon-containing feeds such as oil cuts, cuts derived from coal or hydrocarbons produced from natural gas, and are in particular used for hydrogenation, hydrodenitrogenation, hydrodeoxygenation, hydrodearomatization, hydrodesulphurization, hydrodemetallization, hydroisomerization, hydrodealkylation, dehydrogenation. Catalysts prepared from at least one cobalt and/or nickel salt of at least one Anderson heteropolyanion in accordance with the present invention are also advantageously used for hydrocracking hydrocarbon feeds such as feeds containing aromatic and/or olefinic compounds, and/or naphthenic, and/or paraffinic compounds, said feeds possibly containing metals and/or nitrogen and/or oxygen and/or sulphur.

The feeds used in the various processes using the catalysts prepared from at least one cobalt and/or nickel salt of at least one Anderson heteropolyanion in accordance with the invention are generally selected from the group formed by gasolines, gas oils, vacuum gas oils, deasphalted residues or non deasphalted residues, paraffin oils, waxes and paraffins. They contain at least one heteroatom such as sulphur, oxygen, nitrogen and optionally metals such as nickel and vanadium. The operating conditions for hydrorefining or hydroconversion, such as temperature, pressure, the hydrogen/hydrocarbon volume ratio in litres/litre, the hourly space velocity, may vary widely as a function of the nature of the feed, the quality of the desired products and the facilities available to the refiner. The preferred operating conditions used in the reactor or reactors for the various processes using a catalyst prepared from at least one cobalt and/or nickel salt of at least one Anderson heteropolyanion of the invention are as follows: a temperature of more than 200° C., preferably in the range 200° C. to 450° C., at a pressure in the range 0.5 to 30 MPa, preferably less than 20 MPa, the space velocity being in the range 0.1 to 10 $h^{-1}$, preferably in the range 0.1 to 8 $h^{-1}$, and more preferably in the range 0.2 to 6 $h^{-1}$, and the quantity of hydrogen introduced is such that the hydrogen/hydrocarbon volume ratio in litres/litre is in the range 10 to 5000 l/l, preferably in the range 100 to 2000 l/l.

EXAMPLES

The examples below describe the invention in more detail without limiting its scope. In all of the examples for preparing the catalysts of the present invention, a gamma alumina with a specific surface area of 250 $m^2/g$, sold by AXENS in the form of extrudates, was used as the base support.

Example 1

Preparation, in Oxide State, of Hydrotreatment Catalysts A, A' of the CoMo Type and E and E' of the NiMo Type, Not in Accordance with the Invention 90 g of trilobal gamma alumina extrudates (Axens, 250 $m^2/g$) was dry impregnated with a solution containing molybdenum and cobalt precursors. Dry impregnation is a technique which is well known in the art during which the pore volume of the support is filled with a solution with an equivalent volume containing the precursors of the active phase. The solution used in this case had a volume of 75 ml, and contained 10.6 g of ammonium heptamolybdate (HMA) with formula $(NH_4)_6Mo_7O_{24}$, $4H_2O$ (concentration 96% by weight), 7.2 g of cobalt nitrate $Co(NO_3)_2$, $6H_2O$. After impregnation, the extrudates were allowed to mature for 24 h at ambient temperature in a water-saturated atmosphere. The extrudates were oven dried at 120° C. for two hours. Finally, the extrudates were calcined in the presence of a stream of air of 1.5 l/g of catalyst/h with a temperature ramp-up of 5° C./min and a constant temperature stage of 2 h at 500° C. The catalyst A obtained in the oxide state with formulation CoMo had a molybdenum content of 8.30%, expressed as a % by weight of the oxide $MoO_3$, and a cobalt content of 1.85%, expressed as a % by weight of the oxide CoO. The Co/Mo atomic ratio of this catalyst was 0.41. This catalyst was not in accordance with the invention. Catalyst A' was prepared in an identical manner to that for catalyst A until the drying step. At the end of the drying step, a second dry impregnation stage was carried out on the dry catalyst. 45 ml of a solution containing 10.2 g of HMA and 8.8 g of $Co(NO_3)_2$, $6H_2O$ was used during said second impregnation. The drying and calcining steps were then identical to those of catalyst A. catalyst A' obtained in the oxide state with formulation CoMo had a molybdenum content of 16.30%, expressed as a % by weight of the oxide $MoO_3$, and a cobalt content of 4.10%, expressed as a % by weight of the oxide CoO. The Co/Mo atomic ratio obtained for said catalyst was 0.48. This catalyst was not in accordance with the invention.

Catalyst E was prepared by replacing the cobalt nitrate with nickel nitrate, $Ni(NO_3)_2$, $6H_2O$ 88 g of alumina extrudates was dry impregnated with 74 ml of an aqueous solution containing 11.74 g of HMA and 9.34 g of nickel nitrate. The maturation, drying and calcining steps were identical to those for catalyst A. Catalyst E obtained in the oxide step with NiMo formulation had a molybdenum content of 9.20% as a % by weight of the oxide $MoO_3$ and a nickel content of 2.40%, expressed as a % by weight of the oxide NiO. The Ni/Mo atomic ratio of said catalyst was 0.50. This catalyst was not in accordance with the invention.

Catalyst E' was obtained in the same manner as catalyst A', in two dry impregnation steps with an intermediate drying step using ammonium heptamolybdate (14.16 g) and nickel nitrate (8.17 g) dissolved in 43 ml of aqueous solution. The drying and calcining steps were then identical to those of catalyst A. Catalyst E' obtained in the oxide step with formulation NiMo had a molybdenum content of 20.30%, expressed as a % of the weight of oxide $MoO_3$, and a nickel content of 4.50%, expressed as a % by weight of oxide NiO. The Ni/Mo atomic ratio obtained for this catalyst was 0.48. This catalyst was not in accordance with the invention.

Table 1 summarizes the formulations for the four catalysts A, A', E, E', not in accordance with the invention.

TABLE 1

| | Formulations for catalysts prepared from ammonium heptamolybdate and nickel or cobalt nitrate (not in accordance with the invention) | | | |
|---|---|---|---|---|
| Catalyst | Promoter, X | $MoO_3$ (weight %) | XO (weight %) | Mole ratio X/Mo |
| A | Co | 8.30 | 1.85 | 0.41 |
| A' | Co | 16.30 | 4.10 | 0.48 |
| E | Ni | 9.20 | 2.40 | 0.50 |
| E' | Ni | 20.30 | 4.50 | 0.48 |

Example 2

Preparation of a CoMo Type Hydrotreatment Catalyst B in the Oxide State Using an Impregnation Solution Containing the Heteropolyanion $CoMo_6O_{24}H_6^{3-}$, and Hydrotreatment Catalyst B' from a Solution Containing the Dimeric Form $Co_2Mo_{10}O_{38}H_4^{6-}$ of the Heteropolyanion $CoMo_6O_{24}H_6^{3-}$, Not in Accordance with the Invention 90 g of γ alumina extrudate was introduced into a pelletizer and dry impregnated with a solution containing the $CoMo_6O_{24}H_6.(Co)_{3/2}$ salt (also termed $CoMo_6(Co)$). This solution was obtained using the protocol described in Example 2 of European patent application EP-A1-1 393 802 in particular comprising a step for crystallizing an ammonium salt then ion exchange to exchange the ammonium counterions of the heteropolyanion for cobalt. This latter step produced a Co/Mo mole ratio of 0.41. After the impregnation step, the extrudates were allowed to mature for 24 h at ambient temperature in a water-saturated atmosphere. At the end of maturation, the extrudates were dried overnight at 120° C. then calcined at 450° C. for 2 h in oxygen (temperature ramp-up at 5° C./min). Catalyst B obtained had a molybdenum content of 9.90, expressed as a % by weight of $MoO_3$. Its cobalt content was 2.15, expressed as a % by weight of CoO.

The Co/Mo mole ratio was 0.41. This catalyst was not in accordance with the invention.

90 g of γ alumina extrudates was introduced into a pelletizer and dry impregnated with a solution containing the $Co_2Mo_{10}O_{38}H_4 \cdot (Co)_3$ salt (also termed $Co_2 Mo_{10}(Co)$). This solution was obtained using the protocol described in Example 4 of European patent application EP-A1-1 393 802. The ion exchange step between the $NH_4^+$ and $Co^{2+}$ cations produced a Co/Mo atomic ratio of 0.50. The extrudates were allowed to mature for 24 h at ambient temperature in a water-saturated atmosphere, then dried in air for 12 hours, oven dried at 120° C. then calcined at 450° C. for 2 h in oxygen (temperature ramp-up at 5° C./min, dry air flow rate 1.5 l/g of solid/h) to produce catalyst B'. The formulation for catalyst B' obtained was as follows: 16.3% by weight of $MoO_3$ and 4.1% by weight of CoO. The Co/Mo mole ratio of this catalyst was 0.50. This catalyst was not in accordance with the invention.

Table 2 summarizes the formulations of the two catalysts B and B', not in accordance with the invention.

TABLE 2

Formulation of CoMo catalysts prepared from solution containing the salt $CoMo_6O_{24}H_6 \cdot (Co)_{3/2}$ or the salt $Co_2Mo_{10}O_{38}H_4 (Co)_3$ (not in accordance with the invention)

| Catalyst | Promoter X | $MoO_3$ (wt %) | XO (wt %) | Mole ratio X/Mo |
|---|---|---|---|---|
| B | Co | 9.90 | 2.15 | 0.41 |
| B' | Co | 16.30 | 4.10 | 0.50 |

Example 3

Preparation of Hydrotreatment Catalysts C', D and D' of the CoMo Type in the Oxide State Using a Solution Containing the Salt $CoMo_6(Co)$ and its Dimeric Form $Co_2Mo_{10}(Co)_2$, in Accordance with the Invention 74.3 g of alumina trilobal extrudates was dry impregnated with 77 ml of an aqueous solution prepared in accordance with the invention. The solution was prepared as follows:

a) 77 g of hydrogen peroxide (30% purity) were introduced into a flask, then 21.2 g of $MoO_3$ (96% purity) was introduced: the $H_2O_2$/Mo mole ratio was then 6:

b) the molybdenum trioxide was dissolved over 1h30 by heating under reflux at 80° C. The solution obtained was clear, and then had to be reduced in volume to 62 ml by heating. Once the temperature had returned to ambient temperature, the pH was measured and the value obtained was 0.05;

c) cobalt carbonate (8.6 g, 99% purity) was then introduced cautiously in small quantities to avoid any uncontrolled exothermicity and effervescence; the carbonate dissolved immediately; the pH of the solution obtained was 3.6;

The Raman spectrum of the solution which had been prepared had characteristic bands for $Co_2Mo_{10}(Co)$ salts in solution at 957, 917, 602, 565, 355, 222 cm$^{-1}$, and for $CoMo_6(Co)$ in solution at 952, 903, 575, 355 and 222 cm$^{-1}$.

The prepared solution was used to impregnate onto a gamma alumina support which had been formed into extrudates (Axens, 250 m$^2$/g). The extrudates were then allowed to mature for 24 h in a water-saturated atmosphere, at ambient temperature, then oven dried in air for 12 h at 120° C. The dried catalyst obtained was catalyst C'. Half of catalyst C' was calcined in dry air at 450° C. for 2 h (temperature ramp-up 5° C./min, dry air flow rate 1.5 l/g of solid/h) to produce catalyst D'. The formulation for catalyst D' obtained was as follows: 20.4% by weight of $MoO_3$ and 5.3% by weight of CoO. The amounts of molybdenum and cobalt in catalyst C' were identical to those of catalyst D'. The Co/Mo mole ratio in catalysts C' and D' was 0.49. Said catalysts C' and D' were in accordance with the invention. The values given in Table 3 for catalyst C' were those obtained after correcting for the loss on ignition.

87.4 g of alumina trilobal extrudates was dry impregnated with 74 ml of an aqueous solution prepared in accordance with the invention. The solution was prepared as follows:

a) 38.0 g of hydrogen peroxide (30% purity) was introduced into a flask with 36 g of distilled water, then 10.4 g of $MoO_3$ (96% purity) was introduced: the $H_2O_2$/Mo mole ratio was thus 6:

b) the molybdenum trioxide was dissolved by stirring for about ten hours at ambient temperature. The solution obtained had a pH of 0.07;

c) cobalt carbonate (4.2 g, 99% purity) was then introduced cautiously in small quantities to avoid any uncontrolled exothermicity and effervescence; the carbonate dissolved immediately; the pH of the solution obtained was 3.8;

The Raman spectrum of the solution which had been prepared had characteristic bands for $Co_2Mo_{10}(Co)$ salts in solution at 957, 917, 602, 565, 355, 222 cm$^{-1}$ and for $CoMo_6(Co)$ in solution at 952, 903, 575, 355 and 222 cm$^{-1}$.

The prepared solution was used to impregnate onto a gamma alumina support which had been formed into extrudates (Axens, 250 m$^2$/g). The extrudates were then allowed to mature for 24 h in a water-saturated atmosphere, at ambient temperature, then oven dried in air for 12 h at 120° C. Finally, the extrudates were calcined in dry air at 450° C. for 2 h (temperature ramp-up 5° C./min, dry air flow rate 1.5 l/g of solid/h). The formulation for catalyst D obtained was as follows: 10.0% by weight of $MoO_3$ and 2.6% by weight of CoO. The Co/Mo mole ratio was 0.49. Catalyst D was in accordance with the invention.

The formulations for the three catalysts obtained are summarized in Table 3.

TABLE 2

Formulations of CoMo catalysts prepared from solution containing the salt $Co^{III}Mo_6O_{24}H_6 \cdot (Co)_{3/2}$ or the salt $Co^{III}_2Mo_{10}O_{38}H_4 (Co)_3$

| Catalyst | Promoter X | $MoO_3$ (wt %) | XO (wt %) | Mole ratio X/Mo |
|---|---|---|---|---|
| C' (dry) | Co | 20.4 | 5.3 | 0.49 |
| D' (calcined) | Co | 20.4 | 5.3 | 0.49 |
| D | Co | 10.0 | 2.6 | 0.49 |

Example 4

Comparative Test of Catalysts A, A', B, B', C' and D' for Toluene Hydrogenation in Cyclohexane Under Pressure in the Presence of Hydrogen Sulphide Catalysts A, A', B, B', C' and D' described above were sulphurized in situ under dynamic conditions in a fixed traversed bed tube reactor, the fluids moving from top to bottom. The hydrogenating activity measurements were carried out immediately after sulphurizing under pressure without ingress of air with the hydrocarbon feed which served to sulphurize the catalysts.

The sulphurization and test feed was composed of 5.8% dimethyldisulphide (DMDS), 20% toluene and 74.2% cyclohexane (by weight). The stabilized catalytic activities of equal volumes (40 cm³) of catalysts A, A', B, B', C' and D' were measured for the toluene hydrogenation reaction.

The conditions for measuring the activity were as follows:

| | |
|---|---|
| Total pressure: | 6.0 MPa |
| Toluene pressure: | 0.38 MPa |
| Cyclohexane pressure: | 1.55 MPa |
| Hydrogen pressure: | 3.64 MPa |
| H₂S pressure: | 0.22 MPa |
| Catalyst volume: | 40 cm³ |
| Feed flow rate: | 80 cm³/h |
| Hourly space velocity: | 2 l/l/h |
| Hydrogen flow rate: | 36 l/h |

Sulphurization and test temperature: 350° C. (ramp-up 3° C./min)

Samples of liquid effluent were analyzed by gas chromatography. The molar concentrations of unconverted toluene (T) and the concentrations of the hydrogenation products (methylcyclohexane (MCC6), ethylcyclopentane (EtCC5) and dimethylcyclopentanes (DMCC5)) allowed a toluene hydrogenation rate, XHYD, to be calculated, defined as:

$$XHYD\ (\%) = 100 \times \frac{(MCCC6 + EtCC5 + DMCC5)}{(T + MCC6 + EtCC5 + DMCC5)}$$

The toluene hydrogenation reaction was first order under the test conditions employed and the reactor behaved as an ideal piston reactor, and so the hydrogenating activity, AHYD, of the catalysts was calculated by applying the formula:

$$AHYD = \ln(100/100 - XHYD))$$

Table 4 compares the relative hydrogenating activities, equal to the ratio of the activity of the catalyst under consideration to the activity of catalyst A taken as a reference (100% activity).

TABLE 4

Relative activities for toluene hydrogenation of catalysts A, A', B, B' (not in accordance with the invention), C' and D' (in accordance with the invention)

| Catalyst | Precursors present in impregnation solution | Amount of MoO₃ in catalysts (wt %) | AHYD at same volume of catalyst, relative to A |
|---|---|---|---|
| A, not in accordance | HMA, Co(NO₃)₂ | 8.30 | 100 |
| A', not in accordance | HMA, Co(NO₃)₂ | 16.30 | 196 |
| B, not in accordance | CoMo₆(Co) | 9.90 | 131 |
| B', not in accordance | Co₂Mo₁₀(Co) | 16.30 | 223 |
| C', in accordance | Co₂Mo₁₀(Co) and CoMo₆(Co) | 20.40 | 230 |
| D', in accordance | Co₂Mo₁₀(Co) and CoMo₆(Co) | 20.40 | 283 |

Table 4 demonstrates the large gain in hydrogenating activity at iso-volume obtained for catalysts prepared using the process of the invention compared with catalysts prepared using a process which was not in accordance with the invention.

Example 5

Comparative Test of Catalysts A', B', C' and D' for Hydrodesulphurization of a Straight Run Gas Oil Catalysts A', B', C' and D' described above were also compared in a test for hydrodesulphurization of a gas oil the principal characteristics of which are given below:

| | |
|---|---|
| Density at 15° C.: | 0.8522 |
| Sulphur: | 1.44% by weight |
| Simulated distillation: | |
| IP: | 155° C. |
| 10% by weight: | 247° C. |
| 50% by weight: | 315° C. |
| 90% by weight: | 392° C. |
| EP: | 444° C. |

The test was carried out in an isothermal fixed traversed bed pilot reactor, the fluids moving from bottom to top. After in situ sulphurization at 350° C. in the pressurized unit using the test gas oil to which 2% by weight of dimethyldisulphide had been added, the hydrodesulphurization test was carried out under the following operating conditions:

| | |
|---|---|
| Total pressure: | 7 MPa |
| Catalyst volume: | 30 cm³ |
| Temperature: | 340° C. |
| Hydrogen flow rate: | 24 l/h |
| Feed flow rate: | 60 cm³/h |

The catalytic performances of the test catalysts are shown in Table 5. They are expressed as a relative activity, taking that of catalyst A' to be 100 and assuming they are of apparent order 1.5 with respect to sulphur. The relationship linking the activity and hydrodesulphurization conversion (% HDS) is as follows:

$$AHDS = \sqrt{(100/(100-\%HDS))} - 1$$

TABLE 5

Relative activities, in the hydrodesulphurization of straight run gas oil, of catalysts B' (not in accordance with the invention), C', D' (in accordance with the invention) compared with those of catalyst A' (not in accordance with the invention).

| Catalyst | AHDS relative to A' |
|---|---|
| A' | 100 |
| B' | 135 |
| C' | 138 |
| D' | 147 |

Surprisingly, Table 5 shows the large gain obtained for catalysts C' and D' prepared using the process of the invention as compared with catalysts A' and B', not in accordance with the invention. The performances obtained with catalyst B' (comparative) and catalysts C' and D' (in accordance) show that the catalysts prepared from salts of Anderson heteropolyanions combining at least molybdenum and nickel or at least molybdenum and cobalt in their structure and in accordance with the process of the invention perform better catalytically than a catalyst also prepared from salts of Anderson heteropolyanions combining at least molybdenum and nickel in its structure or at least molybdenum and cobalt in its structure but with a more complex preparation method carried out in two steps, including an ion exchange.

Example 6

Preparation of Hydrotreatment Catalyst F' of the NiMo Type in the Oxide State Using a Solution Containing the Salt NiMo$_6$(Co) and/or its Dimeric form Ni$_2$Mo$_{10}$(Ni), in Accordance with the Invention 73.5 g of alumina trilobal extrudates was dry impregnated with 62 ml of an aqueous solution prepared in accordance with the invention. The solution was prepared as follows:

a) 92.3 g of hydrogen peroxide (30% purity) was introduced into a flask, then 19.5 g of MoO$_3$ (96% purity) was introduced: the H$_2$O$_2$/Mo mole ratio was then 6. The solution was increased to 103 ml using permutated water;

b) the molybdenum trioxide was dissolved over 1h30 by heating under reflux at 80° C. The solution was then reduced in volume to 62 ml by heating to 80° C. The pH was then 0.04;

c) nickel hydroxycarbonate (13.1 g, 94% purity) was then introduced cautiously in small quantities to avoid any uncontrolled exothermicity and effervescence; the hydroxycarbonate dissolved immediately; the pH of the solution was adjusted by adding acid. The Raman spectrum of the solution which had been prepared had characteristic bands for a dissolved nickel salt of the heteropolyanion Ni$_2$Mo$_{10}$O$_{38}$H$_4^{8-}$ at 955, 906, 560 and 360 cm$^{-1}$.

The prepared solution was used to impregnate onto a gamma alumina support which had been formed into extrudates (Axens, 250 m$^2$/g). The extrudates were then allowed to mature for 24 h in a water-saturated atmosphere, at ambient temperature, then dried in air for 12 h in an oven at 120° C. The dried catalyst obtained was calcined in dry air at 450° C. for 2 h (temperature ramp-up 5° C./min, dry air flow rate 1.5 l/g of solid/h) to produce catalyst F'. The formulation for catalyst F' obtained was as follows: 20.0% by weight of MoO$_3$ and 6.3% by weight of NiO. The Ni/Mo mole ratio was 0.6. This catalyst F' was in accordance with the invention.

Example 7

Comparative Test of Catalysts E' (Not in Accordance) and F' (in Accordance) for the Hydrotreatment of Vacuum Distillates NiMo catalysts E' and F' described above were also compared in a hydrotreatment test using a vacuum distillate the principal characteristics of which are given below:

| | |
|---|---|
| Density at 20° C.: | 0.9365 |
| Sulphur: | 2.92% by weight |
| Total nitrogen: | 1400 ppm by weight |
| Simulated distillation: | |
| IP: | 361° C. |
| 10% by weight: | 430° C. |
| 50% by weight: | 492° C. |
| 90% by weight: | 567° C. |
| EP: | 598° C. |

The test was carried out in an isothermal fixed traversed bed pilot reactor, the fluids moving from bottom to top. After in situ sulphurization at 350° C. in the pressurized unit using a straight run gas oil to which 2% by weight of dimethyldisulphide had been added, the hydrodesulphurization test was carried out under the following operating conditions:

| | |
|---|---|
| Total pressure: | 12 MPa |
| Catalyst volume: | 40 cm$^3$ |
| Temperature: | 380° C. |
| Hydrogen flow rate: | 40 l/h |
| Feed flow rate: | 40 cm$^3$/h |

The catalytic performances of the test catalysts are shown in Table 6. They are expressed as a relative activity, taking that of catalyst E' to be 100 and assuming they are of apparent order 1.5 with respect to the total sulphur. The relationship linking the activity and hydrodesulphurization conversion (% HDS) is as follows:

$$AHDS = \sqrt{(100/(100-\%HDS))} - 1$$

The same relationship applied for hydrodenitrogenation (% HDN and AHDN), first order with respect to the total nitrogen.

Further, the crude conversion to a fraction with a boiling point of less than 380° C. was determined for each catalyst. It is expressed from the simulated distillation results (ASTM D86 method) using the relationship:

$$\text{Conversion} = [(\%380+)_{feed} - (\%380-)_{effluent}]/(\%380+)_{feed}$$

in which: $(\%380+)_{feed}$ represents the percentage by weight of feed with a boiling point of more than 380° C.;

$(\%380-)_{effluent}$ represents the percentage by weight of effluent with a boiling point of less than 380° C.

TABLE 6

Relative activities for hydrodesulphurization of a straight run gas oil of catalyst F' (in accordance with the invention) compared with that of catalyst E' (not in accordance with the invention)

| Catalyst | Formulation (NiO/MoO$_3$, wt %) | AHDS relative to E' | AHDN relative to E' | Conversion (%) |
|---|---|---|---|---|
| E' (not in accordance) | 4.5/20.3 | 100 | 100 | 25 |
| F' (in accordance) | 6.3/20.0 | 115 | 120 | 27 |

Surprisingly, Table 6 showed gains in activity obtained for catalyst F' prepared in accordance with the invention compared with catalyst E prepared using a process which was not in accordance with the invention.

Example 8

Comparative Test of Catalysts D, B and A' for the Hydrodesulphurization of a Vacuum Residue The catalytic activity of catalyst D, in accordance with the invention, was studied in HDS of a vacuum residue which had been demetallized and its performance was compared with that of catalyst A', not in accordance with the invention. The feed used was a vacuum residue of light Arab origin (Aramco), which had been partially demetallized by a hydrodemetallization catalyst.

The principal characteristics of this demetallized residue are shown in Table 7.

TABLE 7

Characteristics of the feed used for HDS residue tests

|  | Demetallized vacuum residue |
|---|---|
| Density at 15° C. ($d_4^{15}$) | 0.989 |
| Sulphur (wt %) | 2.3 |
| Ni (ppm by weight) | 12 |
| V (ppm by weight) | 18 |
| C7 asphaltenes (wt %) | 3.9 |
| Conradson carbon CCR (wt %) | 14 |
| N (ppm by weight) | 3600 |

Said feed was treated in an oil residue hydrotreatment pilot unit including a fixed bed reactor functioning in upflow mode.

After a sulphurization step, by circulation a vacuum distillate containing 2% by weight of sulphur at a final temperature of 350° C. in the reactor, the unit was operated with the partially demetallized atmospheric residue described above. The operating conditions employed at the start of the test are shown in Table 8.

TABLE 8

Operating conditions for vacuum residue HDS test

| Total pressure | 15 MPa |
|---|---|
| Temperature | 370° C. |
| Hourly space velocity of residue | 0.5 $h^{-1}$ |
| Flow rate ratio $H_2$/HC (1/1) | 1000 |
| Catalyst volume ($cm^3$) | 40 |

After stabilizing for 300 hours, the hydrodesulphurization (HDS) and CCR reduction (HDCCR) performances were calculated as follows:

$$HDS\ (wt\ \%) = [(S,wt\ \%)_{feed} - (S,wt\ \%)_{test}]/(S,wt\ \%)_{feed} * 100$$

$$HDCCR\ (wt\ \%) = [(CCR,wt\ \%)_{feed} - (CCR,wt\ \%)_{test}]/(CCR,wt\ \%)_{feed} * 100$$

Table 9 compares the performances of catalysts A', B and D for HDS and HDCCR of this vacuum residue.

TABLE 9

HDS and HDCCR performances of catalysts, vacuum residue

| Catalytic system | HDS (wt %) | HDCCR (wt %) |
|---|---|---|
| Catalyst A' | 83 | 39 |
| Catalyst B | 88 | 43 |
| Catalyst D | 90 | 46 |

It can be seen that the CoMo catalyst (D) prepared in one step using the process of the invention containing, in the dry state, cobalt and molybdenum in strong interaction in the form of a heteropolyanion results, after sulphurization, in a catalyst which is more active than the conventional catalyst A' with the same chemical composition, not in accordance with the invention. Catalyst D, prepared in a single step, performed better for hydrodesulphurization and CCR reduction than catalyst B prepared using a prior art method employing two steps including an ion exchange.

Example 9

Preparation of a Bulk Catalyst of the CoMo Type Using a Process in Accordance with the Invention To obtain a CoMo type sold after evaporating to dryness, a solution was prepared as described below:
a) 18.7 g of $MoO_3$ was dissolved in a solution with a volume of 62 ml containing 68 g of hydrogen peroxide (30% purity). The $H_2O_2$/Mo mole ratio was thus 6;
b) the $MoO_3$ dissolved over about 12 h at ambient temperature. A solution with a pH of 0.03 was obtained;
c) cobalt carbonate (7.6 g, 99% pure) was then carefully introduced in small quantities to avoid effervescence; it dissolved immediately. The pH of the solution obtained was 3.5.

The solution was then slowly evaporated to dryness in a rotary evaporator at 70° C. The solid obtained was recovered and placed in an oven at a T=27° C. and P=30 mbar for 1 h. Catalyst G obtained had the following formulation: 78.0% by weight of $MoO_3$ and 18% by weight of CoO. The Co/Mo mole ratio was 0.44. X-ray diffraction analyses showed that the compound obtained was crystalline.

Example 10

Comparison of CoMo Type Catalysts A' and G for Thiophene HDS

Catalysts A' and G described above were tested in thiophene HDS. The test was carried out in a Grignard type reactor (batch reactor) at 200° C. at a pressure of 3.5 MPa in hydrogen, kept constant. The model feed was constituted by 1000 ppm of 3-methylthiophene and 10% by weight of 2,3-dimethyl-2-butene in n-heptane. The volume of the solution was 210 $cm^3$ when cold; the mass of the test catalyst was 4 grams (before sulphurization). Catalyst A' had been ground (315-1000 µm). Before the test, the catalysts were pre-sulphurized on a sulphurization bench, in a $H_2S/H_2$ mixture (4 l/h, 15% by volume of $H_2S$) at 400° C. over two hours (temperature ramp-up 5° C./min), then reduced in pure $H_2$ at 200° C. for two hours. The catalysts were then transferred into a Grignard reactor in the absence of air. The catalytic performances of the test catalysts are given in Table 10. They are expressed as a relative activity, assuming that that of catalyst A' equals 100 and assuming that they are of order 1.5 compared with the total sulphur content. The relationship linking the activity and conversion for hydrodesulphurization (% HDS) is as follows:

$$AHDS = \sqrt{(100/(100 - \%\ HDS))} - 1$$

TABLE 10

Relative HDS activity for same active phase of catalysts A' (not in accordance) and G (in accordance) for thiophene HDS

| Catalyst | Relative HDS activity, same $MoO_3$ content |
|---|---|
| A' | 100% |
| G | 130% |

Table 10 showed a large gain in HDS activity linked to the use of a bulk catalyst obtained starting from the solution of the invention.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated. The entire disclosures of all applications, patents and publications, cited herein and of corresponding French application No. 06/06.828, filed Jul. 24, 2006 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing a petroleum refining catalyst precursor solution formed by at least one cobalt and/or nickel salt of at least one heteropolyanion combining molybdenum and cobalt or molybdenum and nickel in its structure, said process consisting essentially of:
   a) providing an aqueous solution consisting essentially of peroxomolybdate ions at an acidic pH;
   b) introducing at least one cobalt precursor and/or at least one nickel precursor into the solution from step a) to form a solution comprising at least said salt of at least one heteropolyanion in which the (Co+Ni)/Mo mole ratio is in the range of 0.25 to 0.85.

2. A process for preparing a petroleum refining catalyst precursor solution formed by at least one heteropolyanion combining molybdenum and cobalt or molybdenum and nickel in its structure, said process comprising
   a) mixing at least one source of molybdenum and at least one oxidizing compound in aqueous solution to synthesize peroxomolybdate ions at an acidic pH, the oxidizing compound/molybdenum source mole ratio being in the range of 0.1 to 20:
   b) introducing at least one cobalt precursor and/or at least one nickel precursor into the solution from step a) to form a solution comprising at least said salt in which the (Co+Ni)/Mo mole ratio is in the range of 0.25 to 0.85, wherein said peroxomolybdate ions are present at the end of said step a) in a clear aqueous solution with a pH of less than 2.5.

3. A process according to claim 2, in which the molybdenum source in said step a) is molybdenum oxide ($MoO_3$).

4. A process according to claim 2, in which said oxidizing compound is hydrogen peroxide.

5. A process according to claim 2, in which the oxidizing compound/molybdenum source mole ratio in carrying out said step a) is in the range of 2 to 7, and the molybdenum concentration of resultant solution from step (b) is about 2.6 mols per liter.

6. A process according to claim 1, in which the solution formed at the end of said step b) has a pH of more than 3.

7. A process according to claim 1, in which the cobalt precursor and/or the nickel precursor in said step b) is (are) selected from nitrates, sulphates, phosphates, halides, carboxylates, acetates, carbonates, hydroxides and oxides.

8. A process according to claim 1, comprising introducing in step (b) cobalt carbonate.

9. A process according to claim 1, comprising introducing in step (b) nickel hydroxycarbonate.

10. A process according to claim 1, in which at least one cobalt precursor is introduced into said solution from step a) in the absence of a nickel precursor.

11. A process according to claim 1, in which at least one nickel precursor is introduced into said solution from step a) in the absence of a cobalt precursor.

12. A process according to claim 1, in which at least one cobalt precursor and at least one nickel precursor are introduced into said solution from said step a).

13. A process according to claim 1, in which said solution obtained at the end of said step b) has a pH of 3.5 or more.

14. A process according to claim 3, in which said oxidizing compound is hydrogen peroxide.

15. A process according to claim 5, further comprising impregnating the resultant solution of at least one heteropolyanion combining molybdenum and cobalt or molybdenum and nickel in its structure into a catalyst support.

16. A process according to claim 15, wherein the catalyst support comprises an alumina.

17. A process according to claim 16, comprising introducing in step b cobalt carbonate.

18. A process according to claim 16, comprising introducing in step (b) nickel hydroxycarbonate.

19. A catalyst prepared according to the process of claim 15.

* * * * *